(12) United States Patent
Ishwar et al.

(10) Patent No.: US 7,548,541 B2
(45) Date of Patent: Jun. 16, 2009

(54) MANAGING VLAN TRAFFIC IN A MULTIPORT NETWORK NODE USING CUSTOMER-SPECIFIC IDENTIFIERS

(75) Inventors: Prashanth Ishwar, Santa Clara, CA (US); Ajay Gaonkar, Sunnyvale, CA (US); Apurva Mehta, Cupertino, CA (US); Rajagopalan Subbiah, San Jose, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1127 days.

(21) Appl. No.: 10/439,684

(22) Filed: May 16, 2003

(65) Prior Publication Data

US 2004/0078469 A1 Apr. 22, 2004

Related U.S. Application Data

(60) Provisional application No. 60/385,862, filed on Jun. 4, 2002.

(51) Int. Cl.
*H04L 12/28* (2006.01)
(52) U.S. Cl. ..................... 370/390; 370/400
(58) Field of Classification Search ........... 370/389, 370/390, 400
See application file for complete search history.

(56) References Cited

U.S. PATENT DOCUMENTS

| | | | |
|---|---|---|---|
| 5,740,171 A | 4/1998 | Mazzola et al. | |
| 6,208,649 B1 | 3/2001 | Kloth | |
| 6,937,574 B1 * | 8/2005 | Delaney et al. | 370/254 |
| 6,947,419 B2 * | 9/2005 | Liu et al. | 370/390 |
| 6,975,581 B1 * | 12/2005 | Medina et al. | 370/401 |
| 7,092,389 B2 * | 8/2006 | Chase et al. | 370/389 |
| 7,095,738 B1 * | 8/2006 | Desanti | 370/389 |
| 7,233,568 B2 * | 6/2007 | Goodman et al. | 370/218 |
| 2001/0053150 A1 * | 12/2001 | Clear et al. | 370/392 |
| 2002/0009078 A1 * | 1/2002 | Wilson et al. | 370/389 |
| 2002/0146026 A1 * | 10/2002 | Unitt et al. | 370/428 |
| 2003/0037163 A1 * | 2/2003 | Kitada et al. | 709/236 |
| 2003/0055933 A1 * | 3/2003 | Ishizaki et al. | 709/223 |
| 2003/0152075 A1 * | 8/2003 | Hawthorne et al. | 370/389 |
| 2004/0066780 A1 * | 4/2004 | Shankar et al. | 370/389 |
| 2007/0121565 A1 * | 5/2007 | Halasz et al. | 370/338 |

* cited by examiner

*Primary Examiner*—Min Jung

(57) ABSTRACT

A technique for managing traffic in a multiport network node involves establishing customer-specific VLANs within the multiport network node that are identified by a combination of a VLAN ID and a customer ID. Traffic received at the multiport network node is mapped to a customer-specific VLAN and then broadcast to ports that are included in the customer-specific VLAN. Because customer-specific VLANs are identified by a combination of a VLAN ID and customer ID, a service provider can establish and maintain private broadcast domains on a per-customer ID basis. This enables the service provider to expand the number of unique VLAN IDs within the Service Provider Edge Device beyond the 4,096 limitation set by the IEEE 802.1Q standard while maintaining interoperability with the IEEE 802.1Q standard for incoming and outgoing traffic.

17 Claims, 4 Drawing Sheets

Customer-Specific VLAN ID 224

| VLAN ID Field | Customer ID Field |
|---|---|
| ←—— 12-bits ——→ | ←———— 32-bits ————→ |

Customer-Specific Broadcast Domain Table 326

| Customer | Customer-Specific VLAN ID [VLAN ID, Customer ID] | Included Ports |
|---|---|---|
| A | 100, $C_A$ | $P_1, P_3$ |
| B | 100, $C_B$ | $P_2, P_4$ |

VLAN Mapping Table 428

| Incoming Port | VLAN ID | Customer ID |
|---|---|---|
| $P_1$ | 100 | $C_A$ |
| $P_2$ | 100 | $C_B$ |

MANAGING VLAN TRAFFIC IN A MULTIPORT NETWORK NODE USING CUSTOMER-SPECIFIC IDENTIFIERS

CROSS-REFERENCE TO RELATED APPLICATION

This application is entitled to the benefit of provisional Patent Application Ser. No. 60/385,862, filed 04 Jun. 2002.

FIELD OF THE INVENTION

The invention relates generally to a technique for managing traffic in a multiport network node, and more particularly, to a technique for managing customer-specific virtual local area network (VLAN) traffic in a multiport network node.

BACKGROUND OF THE INVENTION

Traditional metropolitan area communications services are based upon technologies such as asynchronous transfer mode (ATM), synchronous optical network (SONET), and Frame Relay technologies, which are optimized for voice communications services. With the increased use of the Internet as a communications medium, non-voice traffic (often referred to as data traffic) is becoming the most prevalent type of network traffic. To meet the increasing demand for data-centric communications services in metropolitan areas, new data-centric metropolitan area networks (MANs) are being built. These new MANs often utilize Ethernet at Layer 2 of the Open System Interconnection (OSI) model to connect nodes within the network (where the OSI model is defined by the International Standardization Organization (ISO)). Ethernet is a popular Layer 2 protocol for use in MANs because of its compatibility with the installed base of end users, its compatibility with the widely used Layer 3 Internet protocol (IP), because of its overall flexibility, and because it is relatively cheap to deploy when compared to other Layer 2 technologies, such as ATM, SONET, and Frame Relay.

Although deploying Ethernet as the Layer 2 technology in MANs has many advantages, the end-user customers, such as businesses, that are targeted to utilize MANs often desire advanced network services such as quality of service (QoS) guarantees, permanent virtual circuits (PVCs), Virtual Leased Lines (VLLs), and transparent LAN services (TLS). Many of these advanced services can be provided by a network that utilizes a Layer 2 technology such as ATM, SONET, or Frame Relay. Ethernet, on the other hand, was not originally designed to provide advanced services and as a result, solutions to customer needs can be more difficult to implement in Ethernet-based networks.

One Ethernet technology that is presently utilized in MANs to provide advanced services to customers is VLAN technology. A VLAN is a group of network devices on different physical LAN segments that can communicate with each other as if they were on the same physical LAN segment. Network devices and their respective network traffic can be mapped into VLAN groups using port-based VLAN mapping, MAC address-based VLAN mapping, protocol-based VLAN mapping, IP subnet-based VLAN mapping, application-based VLAN mapping, and explicit VLAN tagging, or any combination thereof. A widely accepted standard for implementing explicit VLAN tagging in an Ethernet network is defined by the IEEE in its 802.1Q standard. Implementing 802.1Q VLANs involves tagging packets with a Tag Control Information field that identifies the VLAN to which the packets belong. According to the 802.1Q standard, the Tag Control Information field includes a 12-bit VLAN Identifier (ID) field that enables VLANs to be uniquely identified.

FIG. 1 depicts a network 102 that utilizes VLAN technology to connect multiple customers 104 and 106 through a Service Provider Edge Device 112 and two Service Provider Networks 108 and 110. In the example network of FIG. 1, the customers are connected to the Service Provider Networks via an Ethernet-based Service Provider Edge Device 112. In an example network architecture, the customers depicted in FIG. 1 are actually metropolitan service providers (MSPs) that are providing network access to multiple end-users (not shown) and the Service Provider Edge Device and Service Provider Networks belong to large scale network providers, such as the regional Bell operating companies (RBOCs) or long-haul network providers.

Using VLAN technology, a customer, for example Customer A 104 in one location, can connect to another of its locations via the Service Provider Edge Device 112 and the Service Provider Network 108 using a VLAN. As depicted in the example of FIG. 1, the VLAN Identifier (ID) used by Customer A is VLAN ID 100. In operation, the VLAN traffic from Customer A enters the Service Provider Edge Device 112 at port $P_1$ and the input VLAN ID associated with the traffic is used to quickly and efficiently identify the output port for the VLAN traffic. A fundamental principal of known VLAN technology is that the VLAN on which traffic enters a network node is the same as the VLAN on which the traffic exits the network node. In accordance with this principal, the traffic entering port $P_1$ on VLAN ID 100 exits the Service Provider Edge Device through the target output port (i.e., port $P_5$) on the same VLAN ID (i.e., VLAN ID 100) on which the traffic enters the Service Provider Edge Device. VLAN traffic is always kept on the same VLAN because switching traffic to a different VLAN within a network node removes the traffic from the broadcast group to which the traffic was originally associated.

Although VLAN technology works well to provide some advanced services in a MAN environment, VLAN technology has limitations. A significant limitation of VLAN technology that utilizes the 802.1Q VLAN standard is that the length of the VLAN ID field in the 802.1Q VLAN tag is 12 bits. Consequently, any network in which VLANs are deployed is limited to 4,096 unique VLAN IDs (actually, the number of unique VLAN IDs is limited to 4,094 because the value of all ones (0×FFF) is reserved and the value of all zeros (0×000) indicates a priority tag). Because the redundant use of VLAN IDs in the same network should be avoided, the limited number of unique VLAN IDs that are possible using the 12-bit VLAN ID field limits the scalability of a network that utilizes 802.1Q VLANs.

In the example network of FIG. 1, problems of limited scalability and redundant use of VLAN IDs can arise at the Service Provider Edge Device 112 when Customer B 106 wants to forward traffic through the Service Provider Edge Device to Service Provider Network 110 using the same VLAN ID (i.e., VLAN ID 100) as the VLAN ID that is being used by Customer A 104. Because both customers use the same VLAN ID, the broadcast group for VLAN 100 includes ports $P_1$, $P_2$, $P_3$, and $P_4$ (see VLAN table 120). Because the broadcast group for VLAN 100 includes ports $P_3$ and $P_4$, traffic from both of the customers that is received at ports $P_1$ and $P_2$ will be output on the same ports of the Service Provider Edge Device (i.e., ports $P_3$ and $P_4$) with the same VLAN ID. As a result, the customer-specific traffic will be seen by both customers at the far end locations. In order to prevent customer-specific VLAN traffic from being seen by both customers at the far end locations, each VLAN ID within the network should be unique from all of the other VLAN IDs that are used in the network.

One technique that can be implemented to prevent the same VLAN ID from being used by more than one customer within a network involves having the operator of the Service Provider Edge Device (i.e., the Service Provider) administer the assignment of VLAN IDs to the customers. Having VLAN IDs administered by a Service Provider is undesirable because customers typically want the freedom to establish VLANs and assign VLAN IDs independent of their Service Provider.

Even if the assignment of VLAN IDs is administered by a Service Provider, the number of 802.1Q VLANs that can be used within the Service Provider Edge Device cannot scale beyond 4,096 without the redundant use of VLAN IDs. The redundant use of VLAN IDs can be prevented by limiting each customer to some portion of the 4,096 available VLAN IDs, however this limits the ability of the customers to deploy VLAN intensive applications.

In view of the need to provide VLAN-based services using an Ethernet network architecture and in view of the scalability limitations of present VLAN technologies, what is needed is a VLAN technology with greater scalability that can be efficiently and economically implemented.

SUMMARY OF THE INVENTION

A technique for managing traffic in a multiport network node involves establishing customer-specific VLANs within the multiport network node that are identified by a combination of a VLAN ID and a customer ID. Traffic received at the multiport network node is mapped to a customer-specific VLAN and then broadcast to ports that are included in the customer-specific VLAN. Because customer-specific VLANs are identified by a combination of a VLAN ID and customer ID, a service provider can establish and maintain private broadcast domains on a per-customer ID basis. This enables the service provider to expand the number of unique VLAN IDs within the Service Provider Edge Device beyond the 4,096 limitation set by the IEEE 802.1Q standard while maintaining interoperability with the IEEE 802.1Q standard for incoming and outgoing traffic. Additionally, the use of customer IDs and customer-specific VLAN IDs enables customers to administer the assignment of VLAN IDs without being constrained by the service provider.

An embodiment of a method for managing traffic in a multiport network node involves establishing a customer-specific VLAN that specifies ports that are included in the customer-specific VLAN and that is identified by a customer-specific VLAN ID that is a combination of a VLAN ID and a customer ID, mapping traffic to the customer-specific VLAN, and broadcasting the traffic to ports in the customer-specific VLAN.

An embodiment of a system for managing traffic in a multiport network node includes a VLAN Establish Engine, a VLAN Mapping Engine, and a VLAN Broadcast Engine. The VLAN Mapping Engine is configured to establish a customer-specific VLAN that specifies ports that are included in the customer-specific VLAN and that is identified by a customer-specific VLAN ID that is a combination of a VLAN ID and a customer ID. The VLAN Mapping Engine is configured to map traffic to the customer-specific VLAN. The VLAN Broadcast Engine is configured to broadcast the traffic, which is mapped by the VLAN Mapping Engine, to ports in the customer-specific VLAN, which is established by the VLAN Establish Engine.

An embodiment of another method for managing traffic in a multiport network node includes receiving traffic at the multiport network node, identifying a VLAN ID to which the traffic belongs, mapping the traffic to a customer ID, and transmitting the traffic to ports in a broadcast domain wherein the broadcast domain is identified by the combination of the VLAN ID and the customer ID.

Other aspects and advantages of the present invention will become apparent from the following detailed description, taken in conjunction with the accompanying drawings, illustrating by way of example the principles of the invention.

DETAILED DESCRIPTION OF THE INVENTION

Figure 1:
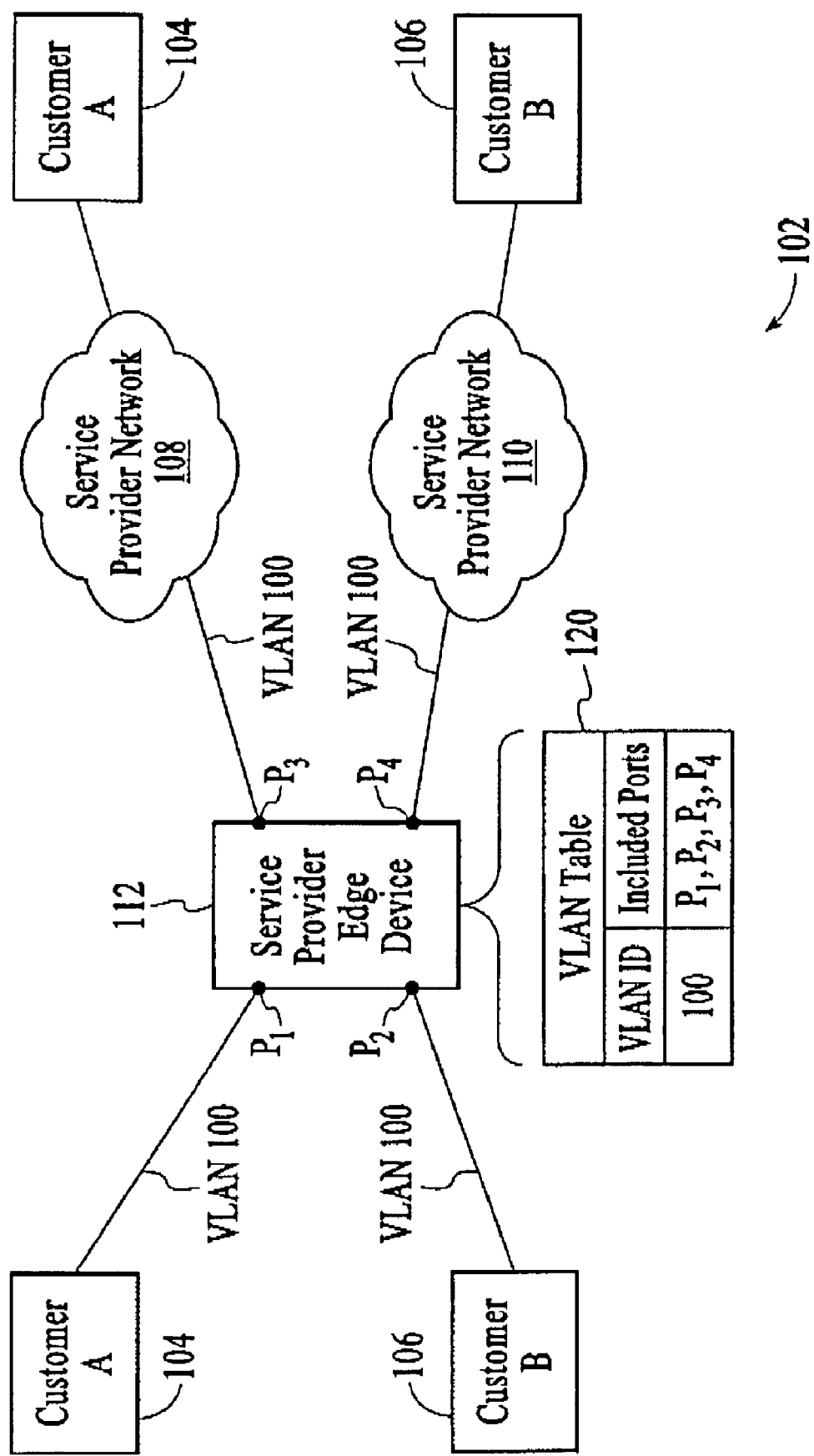
FIG. 1 depicts a network arrangement that utilizes VLAN technology to connect multiple customers through a Service Provider Edge Device and two Service Provider Networks as is known in the prior art.
Figures 2, 3, 4:
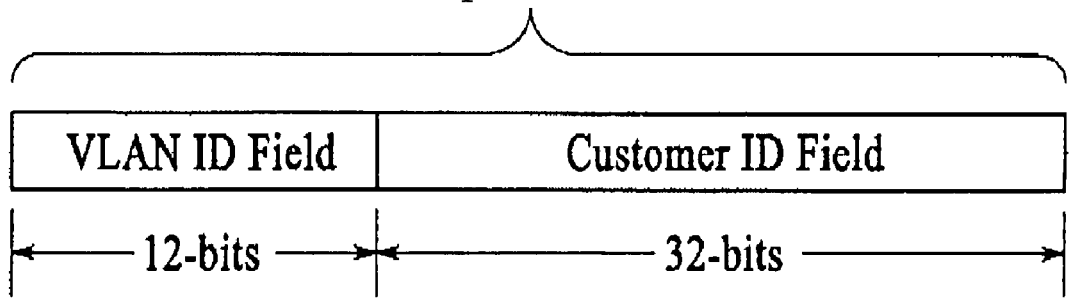
FIG. 2 depicts an example of a customer-specific VLAN ID that is a combination of a 12-bit VLAN ID field and a 32-bit customer ID field in accordance with an embodiment of the invention.
FIG. 3 depicts an example of two customer-specific broadcast domains that are established for two different customers using the customer-specific VLAN ID convention depicted in FIG. 2 in accordance with an embodiment of the invention.
FIG. 4 depicts an example of a table that maps incoming ports and VLAN IDs to customer IDs in accordance with an embodiment of the invention.

In accordance with an embodiment of the invention, customer-specific VLANs are identified within a multiport network node by a combination of a VLAN ID and a customer ID. The VLAN ID is a value that identifies a particular VLAN. In an embodiment, the VLAN ID is the 12-bit value that is specified in the IEEE 802.1Q standard. The customer ID is a value that identifies a particular customer. In an embodiment, the customer ID is a 32-bit value that uniquely identifies a customer. FIG. 2 depicts an example of a customer-specific VLAN ID 224 that is a combination of a 12-bit VLAN ID field and a 32-bit customer ID field. Although in the example of FIG. 2, the VLAN ID and customer ID fields are set at 12-bits and 32-bits, respectively, the length of one or both of the fields may be different in different implementations. For example, a customer ID field of 8-bits could be used to uniquely identify 256 different customers.

In accordance with an embodiment of the invention, customer-specific broadcast domains are established within a multiport network node by associating ports in the multiport network node with customer-specific VLAN IDs. In an embodiment, customer-specific broadcast domains are established using the same techniques that are used to establish known broadcast domains except that the VLAN in a customer-specific broadcast domain is a customer-specific VLAN that is identified by a combination of a VLAN ID and a customer ID as described above with regard to FIG. 2. FIG. 3 depicts an example of a customer-specific broadcast domain table 326 that identifies two customer-specific broadcast domains (also referred to as customer-specific VLANs) that are established for two different customers. As depicted in the table of FIG. 3, the customer-specific broadcast domain for customer A ($C_A$) is identified with the customer-specific VLAN ID of "100, $C_A$" and includes ports $P_1$ and $P_3$. The customer-specific broadcast domain for customer B ($C_B$) is identified with the customer-specific VLAN ID of "100, $C_B$" and includes ports $P_2$ and $P_4$. Because the VLANs are identified by customer-specific VLAN IDs that are a combination of a VLAN ID and a customer ID, two different customers can use the same VLAN ID for traffic to and from the same network node without causing one customer's traffic to be seen by the other customer. For example, customer A can use VLAN 100 for its customer-specific traffic at the same time that customer B is using VLAN 100 for its customer specific traffic.

In an embodiment, different customers can only use the same VLAN ID for traffic to and from the same network node if the customer-specific traffic arrives on different ports of the network node. This limitation exists because it would be difficult to distinguish the traffic of two different customers by looking at the VLAN ID of the traffic if the traffic arrives on the same port with the same VLAN ID.

In operation, incoming traffic is mapped to a customer ID and eventually to a customer-specific VLAN. In an embodiment, the customer ID of traffic is identified from the incoming port and the VLAN ID of the traffic. For example, a lookup is done on the incoming port and VLAN ID of the traffic to determine the customer ID. FIG. 4 depicts an example of a VLAN mapping table 428 that maps incoming ports and VLAN IDs to customer IDs. In the example table of FIG. 4, traffic received on port $P_1$ with a VLAN ID of 100 is mapped to customer ID=$C_A$ while traffic received on port $P_2$ with VLAN ID of 100 is mapped to customer ID=$C_B$. Once the customer ID for traffic is identified, the VLAN ID and customer ID of the traffic are combined to form a customer-specific VLAN ID, for example, as described above with reference to FIG. 2. In an embodiment, the incoming traffic is mapped directly to a customer-specific VLAN ID. That is, the incoming traffic is mapped directly to a VLAN ID and customer ID combination. It should be appreciated that there are many ways that a customer ID can be determined for incoming traffic. For example, in one alternative embodiment, the incoming port of traffic alone determines the customer ID of the traffic such that all traffic received on a particular port is automatically associated with a particular customer ID. This alternative may be advantageous when a customer has a dedicated port connection to a network node.

There are also many techniques that can be used to map incoming traffic to a VLAN ID. For example, incoming traffic can be mapped to a VLAN ID by using port-based VLAN mapping, MAC address-based VLAN mapping, protocol-based VLAN mapping, IP subnet-based VLAN mapping, application-based VLAN mapping, and explicit VLAN ID tagging, or any combination thereof. A widely accepted standard for implementing explicit VLAN ID tagging in an Ethernet network is defined by the IEEE in its 802.1Q standard. Implementing 802.1Q VLANs involves tagging packets with a Tag Control Information field that identifies the VLAN to which the packets belong. According to the 802.1Q standard, the Tag Control Information field includes a 12-bit VLAN ID field that enables VLANs to be uniquely identified. The ports on which tagged VLAN traffic is sent are often referred to as "trunk" ports.

Figure 5:
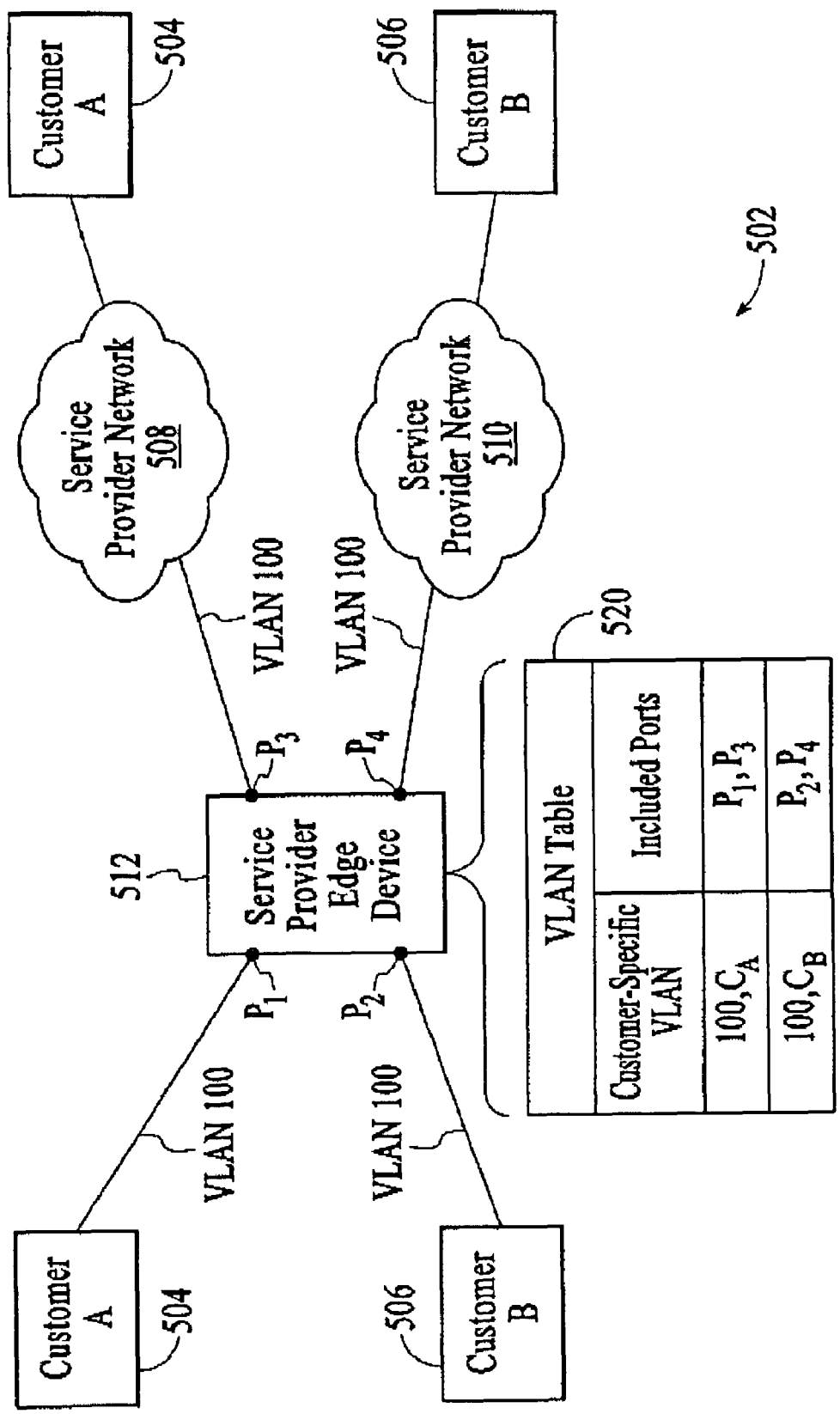
FIG. 5 depicts an example of a network that utilizes customer-specific VLAN IDs as described above with regard to FIGS. 2-4 to connect multiple customers through a Service Provider Edge Device and two Service Provider Networks in accordance with an embodiment of the invention.

FIG. 5 depicts an example of a network 502 that utilizes customer-specific VLAN IDs as described above with regard to FIGS. 2-4 to connect multiple customers 504 and 506 through a Service Provider Edge Device 512 and two Service Provider Networks 508 and 510. In the embodiment of FIG. 5, the Service Provider Edge Device is an Ethernet switch/router that forwards traffic within the network node using Layer 2, Layer 3, and/or Layer 4 header information. The Service Provider Edge Device may include line cards that support network protocols such as Ethernet, ATM, and Frame Relay. Although an Ethernet-based switch/router is described, the disclosed customer-specific VLAN techniques can be applied to any network node that supports VLAN traffic.

For example purposes, it is assumed that the customer-specific broadcast domains described with reference to FIG. 3 are established within the Service Provider Edge Device 512 of FIG. 5. It is also assumed that both customers A and B use the same VLAN ID, VLAN ID 100, to send traffic between the different customer locations. Within the Service Provider Edge Device, traffic from customer A is mapped to customer ID=$C_A$ and ultimately to the customer-specific VLAN ID of "100, $C_A$" and traffic from customer B is mapped to customer ID=$C_B$ and ultimately to the customer-specific VLAN ID of "100, $C_B$." As indicated by the VLAN table 520, traffic that is mapped to the customer-specific VLAN of "100, $C_A$" is broadcast to ports $P_1$ and $P_3$ only and traffic that is mapped to the customer-specific VLAN of "100, $C_B$" is broadcast to ports $P_2$ and $P_4$. As is well known in the field, VLAN traffic is sent to all ports in a broadcast domain except for the port on which the traffic was received. Therefore, in the example of FIG. 5, traffic received at the Service Provider Edge Device at port $P_1$ from customer A (the customer A location on the left-hand side of FIG. 5) is only sent to port $P_3$ because port $P_3$ is the only other port in the customer-specific broadcast domain. If there were additional ports in the broadcast domain of VLAN 100, $C_A$, then traffic would also be broadcast to those other ports. Likewise, traffic received at the Service Provider Edge Device at port $P_2$ from customer B (the customer B location on the left-hand side of FIG. 5) is only sent to port $P_4$ because port $P_4$ is the only other port in the customer-specific broadcast domain. The traffic that is sent out of the multiport network node using a customer-specific VLAN is sent in the same form that it would have been sent using regular VLANs. That is, no additional information (e.g., the customer ID) is attached to VLAN traffic that exits the multiport network node using customer-specific VLANs as described herein. In an embodiment, the VLAN traffic may be further encapsulated, for example in IEEE 802.1Q packets, so that the traffic can be tunneled across a network.

In an embodiment, customers that send traffic through the Service Provider Edge Device 512 of FIG. 5 assign their own VLAN ID to their traffic and the service provider that operates the Service Provider Edge Device assigns its own customer IDs to the customer-specific VLAN traffic. By assigning customer IDs to customer-specific VLAN traffic and establishing customer-specific VLANs, the service provider can establish and maintain private broadcast domains on a per-customer ID basis within the Service Provider Edge Device. This enables the service provider to expand the number of unique VLAN IDs within the Service Provider Edge Device beyond the 4,096 limitation set by the IEEE 802.1Q standard while maintaining interoperability with the IEEE 802.1Q standard for incoming and outgoing traffic. In particular, each customer can utilize the full range of available VLAN IDs independently of the other customers as long as customer IDs are associated with each VLAN ID. Additionally, the use of customer IDs and customer-specific VLAN IDs enables customers to administer the assignment and use of VLAN IDs without being constrained by the service provider.

Figure 6:
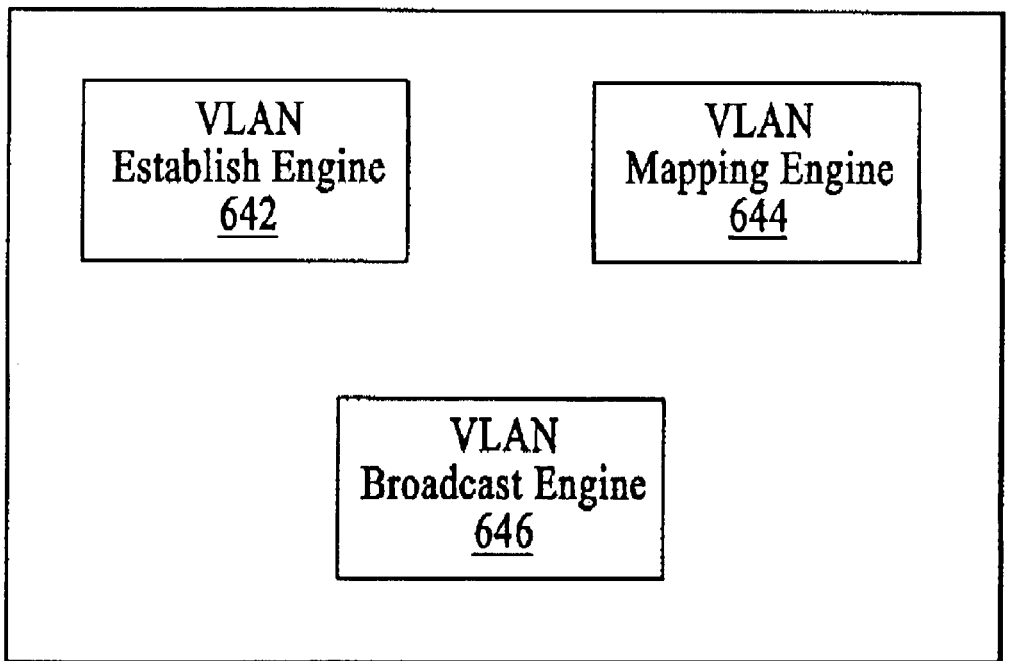
FIG. 6 depicts an embodiment of a system that is configured to support customer-specific VLANs in accordance with an embodiment of the invention.

FIG. 6 depicts an embodiment of a system 640 that is configured to support customer-specific VLANs as described above with regard to FIGS. 2-5. The system includes a VLAN Establish Engine 642, a VLAN Mapping Engine 644, and a VLAN Broadcast Engine 646. The VLAN Establish Engine is configured to perform the function of establishing customer-specific broadcast domains (also referred to as customer-specific VLANs). As described above with regard to FIG. 3, establishing customer-specific broadcast domains involves associating ports in a multiport network node with customer-specific VLAN ID. In an embodiment, customer-specific broadcast domains are established using the same techniques that are used to establish known broadcast domains except that the VLAN in a customer-specific broadcast domain is a customer-specific VLAN that is identified by a combination of a VLAN ID and a customer ID as described above with regard to FIG. 2.

The VLAN Mapping Engine 644 is configured to perform the function of mapping incoming VLAN traffic to a customer ID. In an embodiment, the customer ID is identified from the incoming port and the VLAN ID of the traffic. For example, the VLAN Mapping Engine may include a lookup table, as described above with reference to FIG. 4, that maps the incoming port and VLAN ID to the customer ID. In an embodiment, the lookup table maps the incoming traffic directly to a customer-specific VLAN ID (i.e., the combination of VLAN ID and customer ID).

The VLAN broadcast engine 646 is configured to perform the function of broadcasting incoming VLAN traffic within customer-specific VLANs. That is, traffic associated with a particular customer-specific VLAN is broadcast only to ports within the customer-specific VLAN. In particular, the customer-specific VLAN traffic is broadcast to all ports in the associated customer-specific VLAN except for the port on which the traffic is received.

The VLAN Establish Engine 642, the VLAN Mapping Engine 644, and the VLAN Broadcast Engine 646 reside within a multiport network node such as the Service Provider Edge Device 512 that is depicted in FIG. 5. The VLAN Establish Engine, the VLAN Mapping Engine, and the VLAN Broadcast Engine may be embodied in software, hardware, or any combination thereof. The VLAN Establish Engine, the VLAN Mapping Engine, and the VLAN Broadcast Engine functions may be implemented via multifunction processors and/or application specific processors that are operationally connected to memory. The memory may include circuits for storing operational code, for buffering traffic, and for storing data structures. Operational code is typically stored in non-volatile memory such as electrically erasable programmable read-only memory (EEPROM) or flash ROM while traffic and data structures are typically stored in volatile memory such as random access memory (RAM). Example data structures that are stored in the RAM include configuration state information and traffic forwarding information (i.e., VLAN information). Forwarding information may also be stored in content addressable memory (CAM) or a combination of CAM and RAM.

Figure 7:
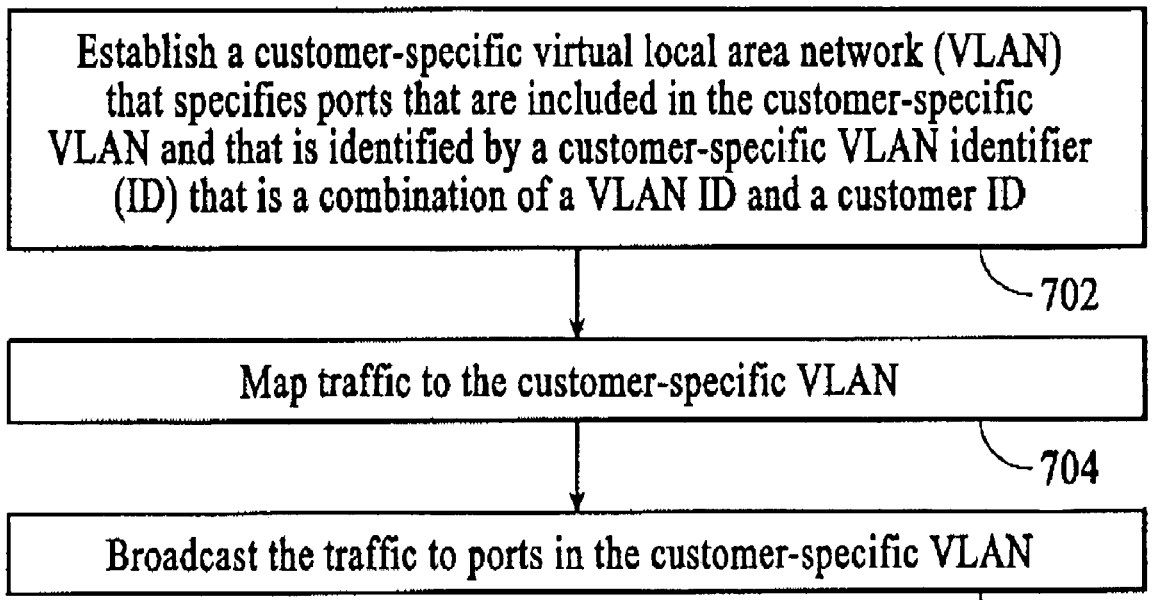
FIG. 7 is a process flow diagram of a method for forwarding traffic through a network node in accordance with an embodiment of the invention.

FIG. 7 is a process flow diagram of a method for managing traffic in a multiport network node. At block 702, a customer-specific VLAN is established that specifies ports that are included in the customer-specific VLAN and that is identified by a customer-specific VLAN ID that is a combination of a VLAN ID and a customer ID. At block 704, traffic is mapped to the customer-specific VLAN and at block 706, the traffic is broadcast to ports in the customer-specific VLAN.

In an embodiment, intermediate network nodes within the service provider network(s) 108 and 110 are also configured to implement customer-specific VLANs as described above.

Although specific embodiments of the invention have been described and illustrated, the invention is not to be limited to the specific forms or arrangements of parts as described and illustrated herein. The invention is limited only by the claims.

What is claimed is:

1. A method for managing traffic in a multiport network node comprising:
   establishing a customer-specific virtual local area network (VLAN), wherein the customer-specific VLAN specifies ports that are included in said customer-specific VLAN and wherein the customer-specific VLAN is identified by a customer-specific VLAN identifier (ID) that is a combination of a VLAN ID and a customer ID;
   mapping traffic to said customer-specific VLAN; and
   broadcasting said traffic to ports that are included in said customer-specific VLAN.

2. The method of claim 1 wherein establishing a customer-specific VLAN includes associating said customer-specific VLAN ID with ports of said multiport network node.

3. The method of claim 1 wherein mapping said traffic to a customer-specific VLAN includes mapping said traffic to said customer ID.

4. The method of claim 1 wherein mapping said traffic to a customer-specific VLAN includes mapping an incoming port of said traffic to said customer ID.

5. The method of claim 1 wherein mapping said traffic to a customer-specific VLAN includes mapping an incoming port and VLAN ID of said traffic to said customer ID.

6. The method of claim 1 wherein said traffic is broadcast to all ports in said customer-specific VLAN except the port on which said traffic is received.

7. The method of claim 1 wherein establishing a customer-specific VLAN includes establishing a customer-specific broadcast domain table in the multiport network node that associates said customer-specific VLAN ID with ports of said multiport network node.

8. The method of claim 7 wherein said customer-specific VLAN ID comprises a fixed bit field having a 12-bit VLAN ID field and a fixed bit customer ID field.

9. A method for managing traffic in a multiport network node comprising:
   receiving traffic at said multiport network node;
   identifying a virtual local area network (VLAN) identifier (ID) to which said traffic belongs;
   mapping said traffic to a customer ID; and
   transmitting said traffic to ports in a customer-specific domain wherein said customer-specific broadcast domain is identified by the customer-specific VLAN identifier (ID) that is a combination of said VLAN ID and said customer ID.

10. The method of claim 9 wherein mapping said traffic to a customer ID includes mapping an incoming port of said traffic to said customer ID.

11. The method of claim 9 wherein mapping said traffic to a customer ID includes mapping an incoming port and said VLAN ID of said traffic to said customer ID.

12. The method of claim 9 further including creating said customer-specific broadcast domain by associating said VLAN ID and said customer ID combination to ports of said multiport network node.

13. The method of 9 wherein said traffic is transmitted to all ports said broadcast domain except the port on which said traffic was received.

14. The method of claim 9 wherein said traffic is received in packets having packet headers and wherein said VLAN ID is identified in a VLAN ID field of said packet headers.

15. The method of claim 9 wherein said VLAN ID is identified by the port on which said traffic is received.

16. The method of claim 9 further including creating said broadcast domain by establishing a customer-specific broadcast domain table in the multiport network node that associates said VLAN ID and said customer ID combination to ports of said multiport network node.

17. The method of claim 16 wherein said customer-specific VLAN ID comprises a fixed bit field having a 12-bit VLAN ID field and a fixed bit customer ID field.

* * * * *